(12) United States Patent
Petiot et al.

(10) Patent No.: US 10,393,204 B2
(45) Date of Patent: Aug. 27, 2019

(54) KINETIC ENERGY ABSORPTION DEVICE AND AIRCRAFT COMPRISING SUCH A DEVICE

(71) Applicant: AIRBUS SAS, Blagnac (FR)

(72) Inventors: Caroline Petiot, Les Ulis (FR); Didier Mesnage, Saint Cloud (FR); Michel Bermudez, Suresnes (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 15/527,753

(22) PCT Filed: Nov. 18, 2015

(86) PCT No.: PCT/EP2015/076991
§ 371 (c)(1),
(2) Date: May 18, 2017

(87) PCT Pub. No.: WO2016/079196
PCT Pub. Date: May 26, 2016

(65) Prior Publication Data
US 2017/0321777 A1 Nov. 9, 2017

(30) Foreign Application Priority Data

Nov. 20, 2014 (EP) ..................................... 14306845

(51) Int. Cl.
*F16F 7/12* (2006.01)
*B64C 1/00* (2006.01)
(Continued)

(52) U.S. Cl.
CPC ................ *F16F 7/124* (2013.01); *B64C 1/00* (2013.01); *B64C 3/00* (2013.01); *B64C 11/20* (2013.01);
(Continued)

(58) Field of Classification Search
CPC .... F16F 7/124; F16F 7/128; F16F 7/12; F16F 2224/0208; B64C 1/00; B64C 3/00; B64C 11/20; B64D 29/00; B64D 2033/022
(Continued)

(56) References Cited

U.S. PATENT DOCUMENTS 4,029,350 A * 6/1977 Goupy ..................... B60Q 1/26
                                                        293/110
4,336,868 A * 6/1982 Wilson .................... B64C 25/60
                                                        188/376
(Continued)

FOREIGN PATENT DOCUMENTS

| DE | 10 2011 107698 A1 | 1/2013 |
| EP | 0 836 032 A2 | 4/1998 |
| FR | 1 243 618 A | 10/1960 |
| GB | 936232 A | 4/1963 |

*Primary Examiner* — Pamela Rodriguez
(74) *Attorney, Agent, or Firm* — Greer, Burns & Crain, Ltd.

(57) ABSTRACT

A device to absorb kinetic energy caused by an exceptional load includes an outer casing configured to maintain integrity after the exceptional load. A core of the device is made of a compactable material at least partially filling the outer casing. The core material is compacted under an exceptional load and absorbs some of the kinetic energy caused by the load. At least one stiffness element is incorporated into the core. A distribution element includes each stiffness element. An aircraft, a vehicle, an item of equipment and an installation includes such a device.

14 Claims, 5 Drawing Sheets

(51) Int. Cl.
*B64C 3/00* (2006.01)
*B64D 29/00* (2006.01)
*B64C 11/20* (2006.01)
*B64D 33/02* (2006.01)

(52) U.S. Cl.
CPC ............... *B64D 29/00* (2013.01); *F16F 7/12* (2013.01); *F16F 7/128* (2013.01); *B64D 2033/022* (2013.01); *F16F 2224/0208* (2013.01)

(58) Field of Classification Search
USPC .......... 188/371, 376; 244/17.11, 117 R, 121, 244/129.1; 293/102, 108, 120, 122, 133
See application file for complete search history.

(56) References Cited

U.S. PATENT DOCUMENTS

| | | | | |
|---|---|---|---|---|
| 6,601,886 B1* | 8/2003 | Thayer | ................... | B60R 19/34 |
| | | | | 188/375 |
| 8,893,865 B2* | 11/2014 | Tanaka | ................... | B64C 1/062 |
| | | | | 188/371 |
| 2005/0001093 A1* | 1/2005 | Hayashi | ................ | B64C 1/062 |
| | | | | 244/17.17 |
| 2014/0144740 A1* | 5/2014 | Ludin | ................... | F16F 7/125 |
| | | | | 188/377 |
| 2015/0167768 A1* | 6/2015 | Zhao | ................... | F16F 1/368 |
| | | | | 267/164 |
| 2015/0353185 A1* | 12/2015 | Petiot | ................... | B32B 5/245 |
| | | | | 244/123.6 |

* cited by examiner

KINETIC ENERGY ABSORPTION DEVICE AND AIRCRAFT COMPRISING SUCH A DEVICE

RELATED APPLICATIONS

This application is a § 371 application from PCT/EP2015/076991 filed Nov. 18, 2015, which claims priority from French Patent Application No 14 306845.0 filed Nov. 20, 2014, each of which is incorporated herein by reference in its entirety.

FIELD OF THE INVENTION

The present invention relates to a device for absorbing kinetic energy due to an exceptional load, an aircraft, a vehicle, equipment and an installation comprising such a device. The present invention applies to the field of devices subjected to exceptional loads, such as dynamic collisions with hard or soft debris.

The present invention applies in particular to the aeronautical field. More particularly, the invention applies in the field of components of aircraft, vehicles, equipment or installations subjected to impacts from hard or soft debris. The components of an aircraft may be a part of the fuselage, a propeller blade or an aircraft engine pylon, for example. The components of equipment may be a wind turbine blade, for example.

BACKGROUND OF THE INVENTION

Elements which are subjected to dynamic collisions can be subject to severe shocks causing these elements to break. In particular, in the case of aircraft, soft debris, such as birds or tire debris, or hard debris, such as hail, ice, rock, for example, may damage components such as a part of the fuselage, a propeller blade, an aircraft engine pylon, for example. Indeed, damage to a blade of an engine can cause partial or total breakage, leading to the blade coming off, causing a chain reaction that could end up with the aircraft crashing.

Particularly, engines with rear-drive contra-rotating open propellers are particularly vulnerable to the possibility of dynamic collisions.

It is therefore important to constantly improve the strengthening of the protection of elements that may be subjected to exceptional loads against such loads.

OBJECT AND SUMMARY OF THE INVENTION

The present invention aims to overcome all or some of these disadvantages. To this end, according to a first aspect, the present invention provides a device for absorbing kinetic energy due to an exceptional load, characterized in that it comprises:
- an outer shell designed in such a way that its integrity is preserved after the exceptional load,
- a core made of compactable material at least partially filling the outer shell, the material constituting the core becoming compacted under an exceptional load and absorbing a part of the kinetic energy due to the load,
- at least one stiffening member integrated in the core, and
- a distribution member comprising each stiffening member.

The advantage of these embodiments is to reduce the vulnerability of an element in the event of an exceptional load, such as a dynamic collision, which may be rapid and have a particular impact. The absorption of the kinetic energy of the exceptional load may take the form of dissipation by breakage of a stiffening member, dissipation by compression of the core, dissipation by deformation of the outer shell, dissipation by friction between a stiffening member and the core, or dissipation by internal friction in a stiffening member.

In some embodiments, the device according to the present invention comprises a diffusion member for diffusing the exceptional load on the core.

These embodiments have the advantage of diffusing the load due to the exceptional load received by the device in order to reach at least one stiffening member, dissipating the energy of the load received by breaking, for example.

In some embodiments, at least one stiffening member is an assembly of unidirectional fibers.

Such an assembly has the advantage of having a high capacity for dissipating energy by breakage or by plastic deformation.

In some embodiments, the unidirectional fibers of the assembly of unidirectional fibers of at least one stiffening member are held by a braided shell.

These embodiments have the advantage of having a high capacity for dissipating energy by breakage or by plastic deformation.

In some embodiments, at least one stiffening member comprises a material for bonding the unidirectional fibers contained in the braided shell.

These embodiments have the advantage of having better resistance to buckling.

In some embodiments, at least one fiber of at least one stiffening member is made of cured polymerized material.

The advantage of these embodiments is greater stiffness of the stiffening member.

In some embodiments, at least a portion of at least one stiffening member is a truncated cylinder.

The advantage of these embodiments is a stiffening member with a constant section, and therefore the physical properties of the stiffening member are similar for each section.

In some embodiments, at least a portion of at least one stiffening member is a truncated cone.

These embodiments have the advantage of better controlling the breakage through triggering and progressive control of the instabilities, such as the breakage of the stiffening member on the truncated cone and beyond, for example. The shape of each stiffening member integrated in the core allows a controlled distribution of the compression forces associated with the load.

In some embodiments, at least one stiffening member is integrated in a concave relief comprised in the core.

The advantage of these embodiments is that they allow control of the positioning of the stiffening member in the volume of the core.

In some embodiments, each stiffening member is distributed equally by the distribution member.

An equal distribution has the advantage of having a kinetic energy dissipation capacity which is evenly distributed over the device. The force transmitted by each stiffening member is distributed evenly over the rear face of the device by the distribution member in order to obtain controlled deformation or breakage.

In some embodiments, the material of the distribution member is included in the group comprising:
- a titanium alloy,
- an aluminum alloy,
- a PBO (p-phenylene-2,6-benzobisoxazole) composite, a DYNEEMA® (registered trademark) composite,
a polyethylene composite,
an aramid composite,
a glass composite, or
another composite.

These embodiments have the advantage of being resistant to corrosion, with the exception of the aluminum alloy in the presence of carbon fibers. Each stiffening member in titanium alloy dissipates the energy from the exceptional load by plastic deformation.

In some embodiments, the material of the diffusion member is included in the group comprising:
a titanium alloy,
an aluminum alloy,
a PBO (p-phenylene-2,6-benzobisoxazole) composite,
a DYNEEMA® (registered trademark) composite,
a polyethylene composite,
an aramid composite,
a glass composite, or
another composite.

These embodiments have the advantage of being resistant to corrosion.

According to a second aspect, the present invention relates to an aircraft which comprises a device according to the present invention.

The advantage of these embodiments is to have, for example, an aircraft comprising elements, such as a part of a fuselage, a propeller blade, an aircraft engine pylon, for example, which are particularly resistant to dynamic collisions with hard or soft debris, such as birds, hail, ice, rock, or pieces of tires, for example.

According to a third aspect, the present invention relates to a vehicle which comprises a device according to the present invention.

As the specific advantages, aims and features of the vehicle according to the present invention are similar to those of the device according to the present invention, they will not be recalled here.

According to a fourth aspect, the present invention relates to equipment which comprises a device according to the present invention.

As the specific advantages, aims and features of the equipment according to the present invention are similar to those of the device according to the present invention, they will not be recalled here.

According to a fifth aspect, the present invention relates to an installation which comprises a device according to the present invention.

As the specific advantages, aims and features of the installation according to the present invention are similar to those of the device according to the present invention, they will not be recalled here.

BRIEF DESCRIPTION OF THE FIGURES

Other particular advantages, aims and features of the invention will become clear from the following non-limiting description of at least one particular embodiment of a device for absorbing kinetic energy due to an exceptional load, an aircraft, a vehicle, equipment and an installation comprising such a device, with reference to the accompanying drawings, in which.

DESCRIPTION OF EMBODIMENTS OF THE INVENTION

It should be noted at the outset that the figures are not to scale.

The present description is given by way of non-limiting example, with each feature of an embodiment being combinable with any other feature of any other embodiment in an advantageous manner.

Note that the term "one" is used in the sense of "at least one".

Note that an exceptional load means a load due to a dynamic collision, for example.

Figure 1:
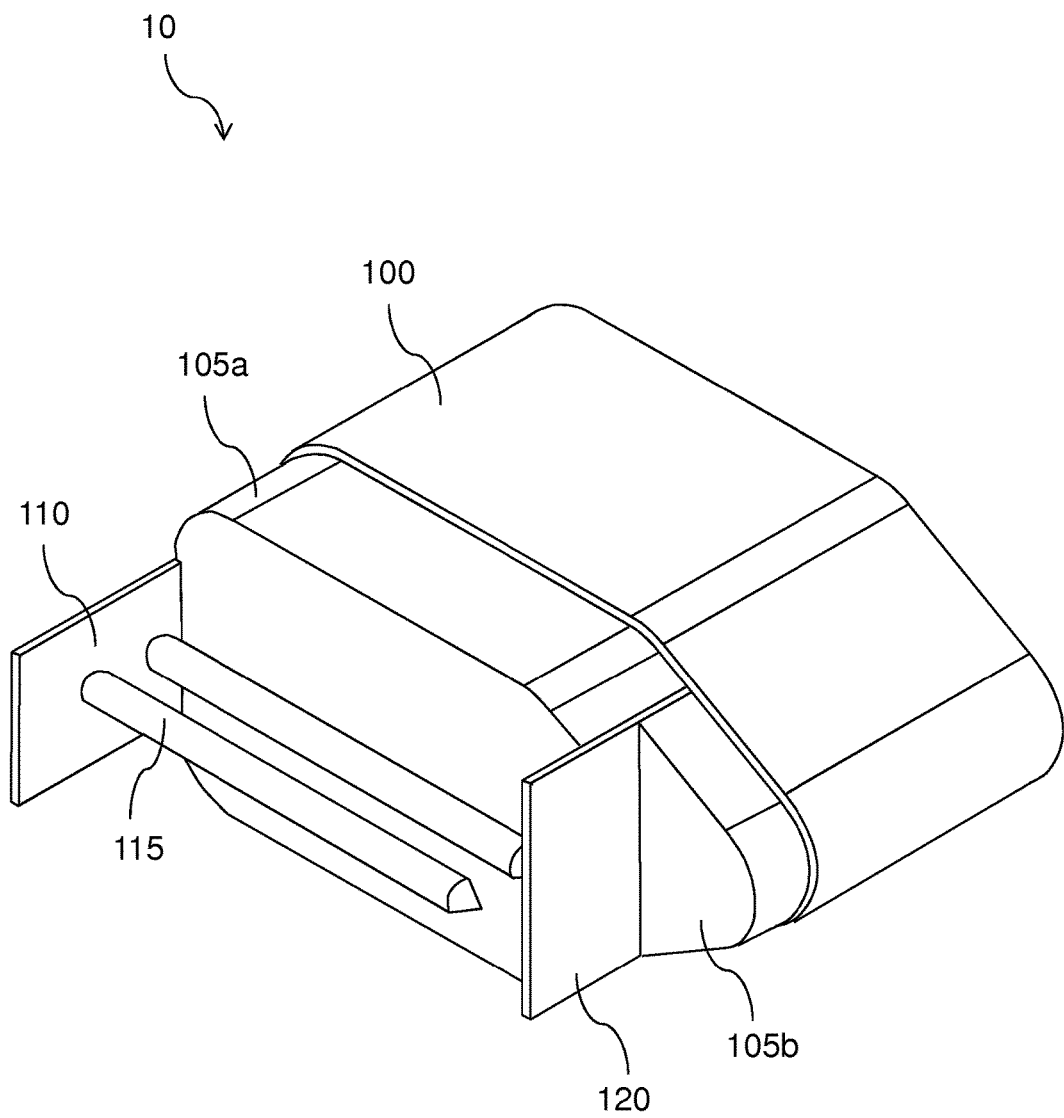
FIG. 1 shows, schematically and in perspective, a first particular embodiment of a device according to the present invention.

FIG. 1 shows an embodiment 10 of a device according to the present invention.

The device 10 for absorbing kinetic energy due to an exceptional load comprises:
  an outer shell 100 designed in such a way that its integrity is preserved after the exceptional load,
  a core, 105a and 105b, made of compactable material at least partially filling the outer shell 100, the material constituting the core becoming compacted under an exceptional load and absorbing a part of the kinetic energy due to the load,
  at least one stiffening member 115 integrated in the core, 105a and 105b,
  a distribution member 110 comprising each stiffening member 115,
  a diffusion member 120 for diffusing the exceptional load on the core, 105a and 105b.

In the event of an exceptional load, the outer shell 100 deforms without losing its integrity. The material of the outer shell 100 has a deformable behavior. Preferably, the outer shell 100 constitutes a braid of composite fibers. The composite fibers are carbon, aramid, PBO (polyphenylene-2,6-benzobisoxazole) fiber, polyethylene fiber, DYNEEMA® (registered trademark) fiber, glass fiber or a mixture of composite fibers, for example.

The core, 105a and 105b, may comprise several portions. For example, the core, 105a and 105b, has a portion 105a in contact with a face of the diffusion member 120 and a portion 105b in contact with another face 105b of the diffusion member 120. The core, 105a and 105b, is included in the outer shell 100.

The material constituting the core, 105a and 105b, may be:
  a cellular material,
  a foam material, a dry fibrous preform, a partially impregnated fibrous preform, or a material with a lower compressive strength than the material of the outer shell 100, for example.

The material constituting the core, 105a and 105b, may be machinable or shaped by molding. The material constituting the core, 105a and 105b, may have a variable density. Each portion of the core, 105a or 105b, may be made of a different material.

Preferably, each stiffening member 115 is positioned in the core, 105a and 105b, which holds the stiffening members 115 in place.

The core, 105a and 105b, may comprise at least one concave relief. Each concave relief corresponds to a stiffening member 115.

A stiffening member 115 is preferably an assembly of unidirectional fibers, held by a braided shell. In some embodiments, a stiffening member 115 is an assembly of titanium alloy nails. In some embodiments, the assembly of titanium alloy nails of a stiffening member 115 is held by a braided shell.

The direction of the fibers is preferably in the greatest direction of the stiffening member 115. In some embodiments, the direction of the nails is preferably in the greatest direction of the stiffening member 115. Preferably, a fiber of at least one stiffening member 115 is made of cured polymerized material, such as pultruded carbon, for example. The fibers in a stiffening member 115 may be of different natures. The braided shell is preferably a braid of carbon fibers, and the tensile mechanical strength of the braid is therefore high. In some embodiments, the braided shell is impregnated with resin.

A stiffening member 115 may comprise a material for bonding the unidirectional fibers contained in the shell. The bonding material may be a resin or a foam, for example. The bonding material may be injected according to the RTM (standing for "Resin Transfer Molding") method. The bonding material reduces the stiffness of the stiffening member 115 and increases the buckling resistance upon compression of the stiffening member 115.

The braided shell of the stiffening member 115 stabilizes the unidirectional fibers and resists buckling of the stiffening member 115. The unidirectional fibers are preferably juxtaposed. The section of the fibers is polygonal, circular or ovoid, for example. The unidirectional fibers of the stiffening member 115 may be assembled with or without polymerization.

A stiffening member 115 has at least one portion in the form of a truncated cylinder. It is recalled that a cylinder is a surface in space defined by a straight line, called a generatrix, passing through a variable point describing a closed planar curve, called a directrix curve, and keeping a fixed direction.

Preferably, the directrix curve of the truncated cylinder of the stiffening member 115 is a circle, a polygon or an ovoid curve.

A stiffening member 115 has at least one portion in the form of a truncated cone. It is recalled that a cone is a ruled surface defined by a straight line, called a generatrix, passing through a fixed point, called a vertex, and a variable point describing a closed planar curve, called a directrix curve.

Preferably, the stiffening member 115 consists of a truncated cylinder juxtaposed with a truncated cone. The truncated cone is a cone of revolution. The directrix curve of the truncated cone of the stiffening member 115 is identical to the directrix curve of the truncated cylinder of the stiffening member 115. The largest base of the truncated cone and a base of the truncated cylinder coincide.

Preferably, the directrix curve of the truncated cone is a circle and the directrix curve of the truncated cylinder is a circle.

In some embodiments, the stiffening member 115 may comprise at least one section pre-damaged by one or more notches. The space between the notches is similar, for example.

The distribution member 110 comprises each stiffening member 115. The stiffening members 115 are distributed equally over the distribution member 110. Preferably, the stiffening members 115 are parallel to one another, perpendicular to the distribution member 110 and aligned on a straight line.

The distribution member 110 is a plate. Preferably, each stiffening member 115 is assembled to the distribution member 110 by RTM (Resin Transfer Molding) injection. Preferably, one of the faces of the distribution member 110 is coplanar with a face of the outer shell 100.

Preferably, the distribution member 110 is made of:
titanium alloy,
aluminum alloy,
PBO (p-phenylene-2,6-benzobisoxazole) composite,
DYNEEMA® (registered trademark) composite,
polyethylene composite,
aramid composite,
glass composite,
another composite, or
forming alloy.

The distribution member 110 may comprise at least two stiffening members 115 of different shape or composition.

Preferably, the distribution member 110 for distributing the mechanical loads due to the exceptional load is placed at a location in the device 10 away from the locations on the outer shell 100 where an exceptional load is likely to be received. The distribution member 110 is interfaced with each stiffening member 115 and adapts the deformation and/or breakage of the outer shell 100.

The diffusion member 120 for diffusing the load, on the core, 105a and 105b, is a plate. Preferably, the diffusion member 120 is made of:
titanium alloy,
aluminum alloy,
PBO (p-phenylene-2,6-benzobisoxazole) composite,
DYNEEMA® (registered trademark) composite,
polyethylene composite,
aramid composite,
glass composite,
another composite, or
forming alloy.

The diffusion member 120 is placed perpendicular to the locations on the outer shell 100 where an exceptional load is likely to be received. The diffusion member 120 faces at least two stiffening members 115.

Preferably, the distribution member 110 and the diffusion member 120 are parallel.

The distribution member 120 is comprised between a portion of the core 105a and a portion of the core 105b. In some embodiments, the distribution member 120 is coplanar with the outer shell 100.

In the event of an exceptional load, the outer shell 100 deforms under the load. The load is transmitted to a portion of the core 105b, which at least partially compresses under the load. The load reaching the diffusion member 120 is distributed over a part of one face of the diffusion member 120. The load diffused is transmitted to the portion of the core 105*a* in which the stiffening members 115 are placed, distributed by means of the distribution member 110.

The stiffening members 115 are held in place by the portion of the core 105*a* and absorb the residual load. The end of the stiffening member 115 concentrates the initial load, especially if the end of the stiffening member 115 is the vertex of a cone of revolution. The residual load is absorbed in at least one of the following ways:

- fragmentation or breakage of the fibers,
- interfacial decohesion, if the stiffening member 115 comprises a bonding material,
- decohesion between the braided shell and the fibers,
- friction between the fibers of the braided shell, or
- tensile breakage of the fibers of the braided shell.

In some embodiments, the residual load is absorbed by plasticization of titanium alloy nails.

The integrity of the structure of the outer shell 100 is preserved.

Figure 2:
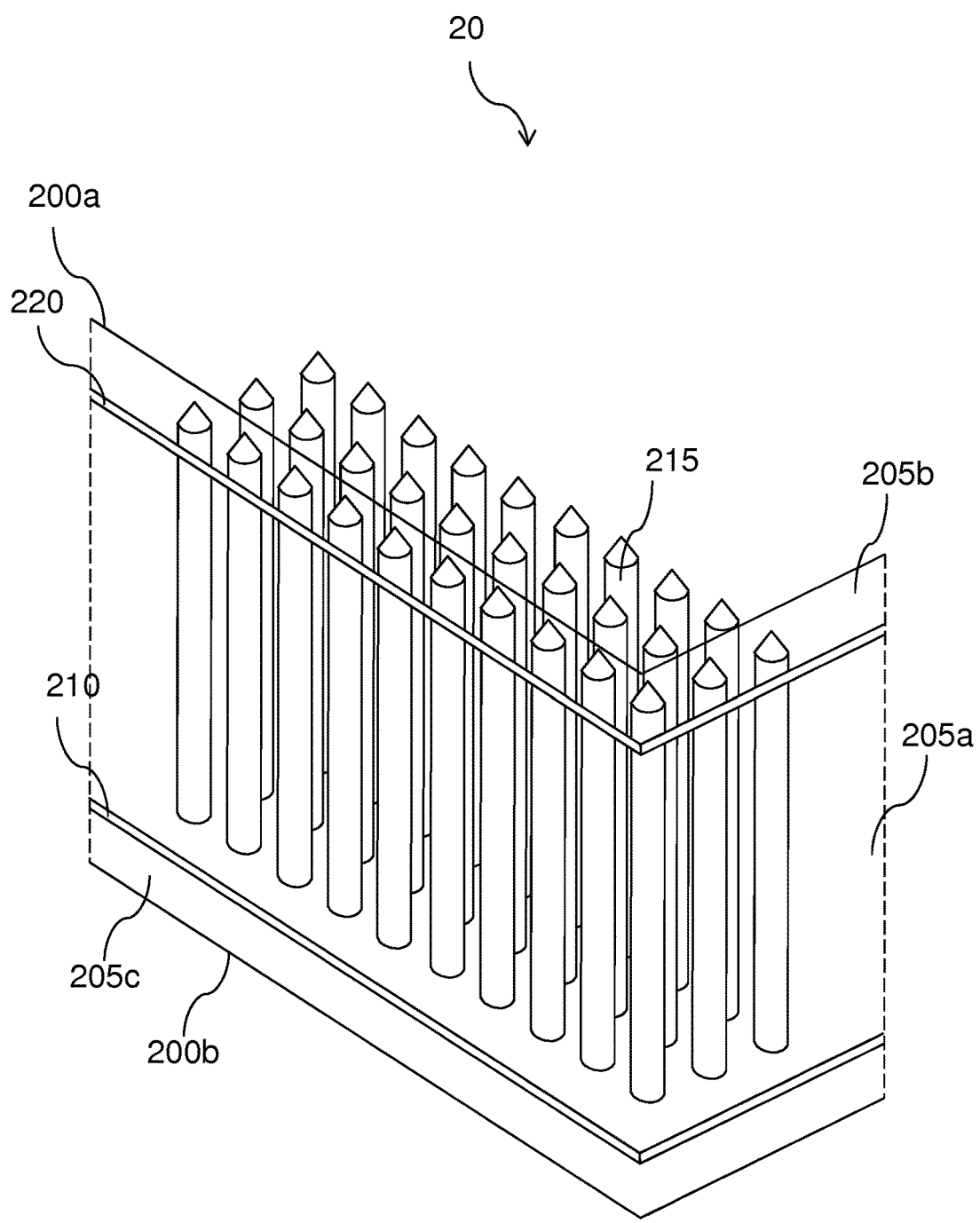
FIG. 2 shows, schematically and in perspective, a second particular embodiment of a device according to the present invention.

FIG. 2 shows an embodiment 20 of a device according to the present invention.

The device 20 for absorbing kinetic energy due to an exceptional load comprises:

- an outer shell, 200*a* and 200*b*, designed in such a way that its integrity is preserved after the exceptional load,
- a core, 205*a*, 205*b* and 205*c*, made of compactable material at least partially filling the outer shell, the material constituting the core, 205*a*, 205*b* and 205*c*, becoming compacted under a load of an exceptional load and absorbing a part of the kinetic energy due to the load,
- at least one stiffening member 215 integrated in the core, 205*a*,
- a distribution member 210 comprising each stiffening member 215, and
- a diffusion member 220 for diffusing the load on the core 205.

In the event of an exceptional load, the outer shell, 200*a* and 200*b*, deforms without losing its integrity. The material of the outer shell, 200*a* and 200*b*, has a deformable behavior. Preferably, the outer shell, 200*a* and 200*b*, constitutes a braid of composite fibers. The composite fibers are carbon, aramid, PBO (polyphenylene-2,6-benzobisoxazole) fiber, DYNEEMA® (registered trademark) fiber, polyethylene fiber, glass fiber or a mixture of composite fibers, for example. The material of the portion 200*a* of the outer shell, 200*a* and 200*b*, may be independent of the material of the portion 200*b* of the outer shell, 200*a* and 200*b*.

The core, 205*a*, 205*b* and 205*c*, may comprise several portions. For example, the core, 205*a*, 205*b* and 205*c*, comprises:

- a portion 205*a* in contact with a face of the diffusion member 220, a face of the distribution member 210 and at least one stiffening member 215,
- a portion 205*b* in contact with another face of the diffusion member 220 and the outer shell 200*a*, and
- a portion 205*c* in contact with a face of the distribution member 210 and the outer shell 200*b*. The core, 205*a*, 205*b* and 205*c*, is included in the outer shell, 200*a* and 200*b*.

The material constituting the core, 205*a*, 205*b* and 205*c*, may be:

- a cellular material,
- a foam material,
- a dry fibrous preform,
- a partially impregnated fibrous preform, or
- a material with a lower compressive strength than the material of the outer shell 200, for example.

The material constituting the core, 205*a*, 205*b* and 205*c*, may be machinable or shaped by molding. The material constituting the core, 205*a*, 205*b* and 205*c*, may have a variable density. Each portion of the core, 205*a*, 205*b* or 205*c*, may be made of a different material with different physical properties.

Preferably, each stiffening member 215 is positioned in the core, 205*a*, 205*b* and 205*c*, which holds the stiffening members in place.

The core, 205*a*, 205*b* and 205*c*, may comprise at least one concave relief. Each concave relief corresponds to a stiffening member 215.

A stiffening member 215 is preferably an assembly of unidirectional fibers, held by a braided shell. In some embodiments, a stiffening member 215 is an assembly of titanium alloy nails. In some embodiments, the assembly of titanium alloy nails of a stiffening member 215 is held by a braided shell. The direction of the fibers is preferably in the greatest direction of the stiffening member 215. Preferably, a fiber of at least one stiffening member 215 is made of cured polymerized material, such as pultruded carbon, for example. The fibers in a stiffening member 215 may be of different natures. The braided shell is preferably a braid of carbon fibers, and the tensile mechanical strength of the braid is therefore high. In some embodiments, the braided shell is impregnated with resin.

A stiffening member 215 may comprise a material for bonding the unidirectional fibers contained in the shell. The bonding material may be a resin or a foam, for example. The bonding material may be injected according to the RTM (standing for "Resin Transfer Molding") method. The bonding material reduces the stiffness of the stiffening member 215 and increases the buckling resistance upon compression of the stiffening member 215.

The braided shell of the stiffening member 215 stabilizes the unidirectional fibers and resists buckling of the stiffening member 215. The unidirectional fibers are preferably juxtaposed. The section of the fibers is polygonal, circular or ovoid, for example. The unidirectional fibers of the stiffening member 215 may be assembled with or without polymerization.

A stiffening member 215 has at least one portion in the form of a truncated cylinder. It is recalled that a cylinder is a surface in space defined by a straight line, called a generatrix, passing through a variable point describing a closed planar curve, called a directrix curve, and keeping a fixed direction.

Preferably, the directrix curve of the truncated cylinder of the stiffening member 215 is a circle, a polygon or an ovoid curve.

A stiffening member 215 has at least one portion in the form of a truncated cone. It is recalled that a cone is a ruled surface defined by a straight line, called a generatrix, passing through a fixed point, called a vertex, and a variable point describing a closed planar curve, called a directrix curve.

Preferably, the stiffening member 215 consists of a truncated cylinder juxtaposed with a truncated cone. The truncated cone is a cone of revolution. The directrix curve of the truncated cone of the stiffening member 215 is identical to the directrix curve of the truncated cylinder of the stiffening member 215. The largest base of the truncated cone and a base of the truncated cylinder coincide. Preferably, the directrix curve of the truncated cone is a circle and the directrix curve of the truncated cylinder is a circle.

In some embodiments, the stiffening member 215 may comprise at least one section pre-damaged by one or more notches. The space between the notches is similar, for example.

The distribution member 210 comprises each stiffening member 215. The stiffening members 215 are distributed equally over the distribution member 210. Preferably, the stiffening members 215 are parallel to one another, perpendicular to the distribution member 210 and distributed in a grid pattern.

The distribution member 210 is a plate. Preferably, each stiffening member 215 is assembled to the distribution member 210 by RTM (Resin Transfer Molding) injection. Preferably, one of the faces of the distribution member 210 is parallel to a face of the outer shell.

Preferably, the distribution member 210 is made of:
titanium alloy,
aluminum alloy,
PBO (p-phenylene-2,6-benzobisoxazole) composite,
DYNEEMA® (registered trademark) composite,
polyethylene composite,
aramid composite,
glass composite,
another composite, or
forming alloy.

The distribution member 210 may comprise at least two stiffening members 215 of different shape or composition.

Preferably, the distribution member 210 for distributing the mechanical loads due to the exceptional load is placed at a location in the device 10 away from the locations on the outer shell, 200a and 200b, where an exceptional load is likely to be received. The distribution member 210 is interfaced with each stiffening member 215 and adapts the deformation and/or breakage of the outer shell, 200a and 200b.

The diffusion member 220 for diffusing the load, on the core, 205a, 205b and 205c, is a plate. Preferably, the diffusion member 220 is made of:
titanium alloy,
aluminum alloy,
PBO (p-phenylene-2,6-benzobisoxazole) composite,
DYNEEMA® (registered trademark) composite,
polyethylene composite,
aramid composite,
glass composite,
another composite, or
forming alloy.

The diffusion member 220 is placed perpendicular to the locations on the outer shell 200a where an exceptional load is likely to be received. The diffusion member 220 faces at least two stiffening members 215.

Preferably, the distribution member 210 and the diffusion member 220 are parallel.

The distribution member 220 is comprised between a portion of the core 205a and a portion of the core 205b. In some embodiments, the distribution member 220 is coplanar with the outer shell 200a.

In the event of an exceptional load, the outer shell 200a deforms under the load. The load is transmitted to a portion of the core 205b, which at least partially compresses under the load. The load reaching the diffusion member 220 is distributed over a part of one face of the diffusion member 220. The load diffused is transmitted to the portion of the core 205a in which the stiffening members 215 are placed, distributed by means of the distribution member 210.

The stiffening members 215 are held in place by the portion of the core 205a and absorb the residual load. The end of the stiffening member 215 concentrates the initial load, especially if the end of the stiffening member 215 is the vertex of a cone of revolution. The residual load is absorbed in at least one of the following ways:
fragmentation or breakage of the fibers,
interfacial decohesion, if the stiffening member 215 comprises a bonding material,
decohesion between the braided shell and the fibers,
friction between the fibers of the braided shell, or
tensile breakage of the fibers of the braided shell.

In some embodiments, the residual load is absorbed by plasticization of titanium alloy nails.

The integrity of the structure of the outer shell, 200a and 200b, is preserved.

Figure 3:
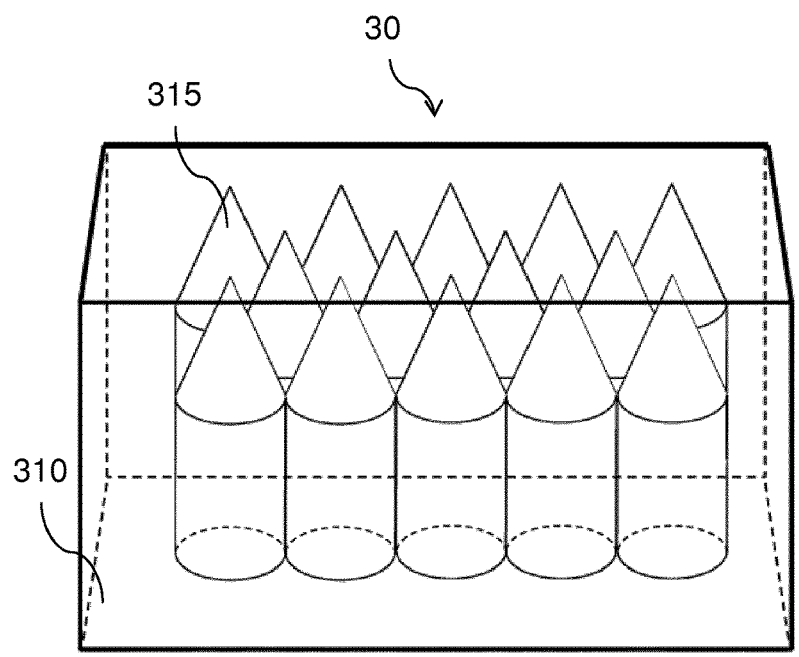
FIG. 3 shows, schematically and in perspective, part of a third particular embodiment of a device according to the present invention.

FIG. 3 shows part of an embodiment 30 of a device according to the present invention.

The part of the device 30 for absorbing kinetic energy due to an exceptional load comprises:
at least one stiffening member 315 and
a distribution member 310 comprising each stiffening member 315.

A stiffening member 315 is preferably an assembly of unidirectional fibers, held by a braided shell. In some embodiments, a stiffening member 315 is an assembly of titanium alloy nails. In some embodiments, the assembly of titanium alloy nails of a stiffening member 315 is held by a braided shell. The direction of the fibers is preferably in the greatest direction of the stiffening member 315. Preferably, a fiber of at least one stiffening member 315 is made of cured polymerized material, such as pultruded carbon, for example. The fibers in a stiffening member 315 may be of different natures. The braided shell is preferably a braid of carbon fibers, and the tensile mechanical strength of the braid is therefore high. In some embodiments, the braided shell is impregnated with resin.

A stiffening member 315 may comprise a material for bonding the unidirectional fibers contained in the shell. The bonding material may be a resin or a foam, for example. The bonding material may be injected according to the RTM (standing for "Resin Transfer Molding") method. The bonding material reduces the stiffness of the stiffening member 315 and increases the buckling resistance upon compression of the stiffening member 315.

The braided shell of the stiffening member 315 stabilizes the unidirectional fibers and resists buckling of the stiffening member 315. The unidirectional fibers are preferably juxtaposed. The section of the fibers is polygonal, circular or ovoid, for example. The unidirectional fibers of the stiffening member 315 may be assembled with or without polymerization.

A stiffening member 315 has at least one portion in the form of a truncated cylinder. It is recalled that a cylinder is a surface in space defined by a straight line, called a generatrix, passing through a variable point describing a closed planar curve, called a directrix curve, and keeping a fixed direction.

Preferably, the directrix curve of the truncated cylinder of the stiffening member 315 is a circle, a polygon or an ovoid curve.

A stiffening member 315 has at least one portion in the form of a truncated cone. It is recalled that a cone is a ruled surface defined by a straight line, called a generatrix, passing through a fixed point, called a vertex, and a variable point describing a closed planar curve, called a directrix curve.

Preferably, the stiffening member 315 consists of a truncated cylinder juxtaposed with a truncated cone. The truncated cone is a cone of revolution. The directrix curve of the truncated cone of the stiffening member 315 is identical to the directrix curve of the truncated cylinder of the stiffening member 315. The largest base of the truncated cone and a base of the truncated cylinder coincide. Preferably, the directrix curve of the truncated cone is a circle and the directrix curve of the truncated cylinder is a circle.

In some embodiments, the stiffening member 315 may comprise at least one pre-damaged section, such as one or more notches. The space between the notches is the same, for example.

The distribution member 310 comprises each stiffening member 315. The stiffening members 315 are distributed equally over the distribution member 310. Preferably, the stiffening members 315 are parallel to one another, perpendicular to the distribution member 310 and distributed in a staggered grid pattern.

The distribution member 310 is a plate. Preferably, each stiffening member 315 is assembled to the distribution member 310 by RTM (Resin Transfer Molding) injection. Preferably, one of the faces of the distribution member 310 is coplanar with a face of the outer shell.

Preferably, the distribution member 310 is made of:
titanium alloy,
aluminum alloy,
PBO (p-phenylene-2,6-benzobisoxazole) composite,
DYNEEMA® (registered trademark) composite,
polyethylene composite,
aramid composite,
glass composite,
another composite, or
forming alloy.

The distribution member 310 may comprise at least two stiffening members 315 of different shape or composition.

In some embodiments, the distribution of the stiffening members 315 by means of the distribution member 310 is defined in three dimensions.

Figure 4:
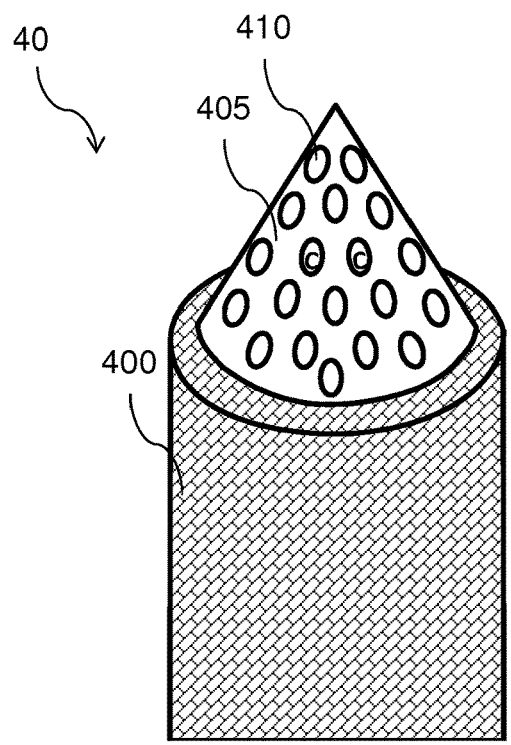
FIG. 4 shows, schematically and in perspective, a first particular embodiment of a stiffening member of a device according to the present invention.

FIG. 4 shows a particular embodiment 40 of a stiffening member of a device according to the present invention.

A stiffening member 40 is preferably an assembly of unidirectional fibers 410 included in a bonding material 405 and held by a braided shell. The direction of the fibers 410 is preferably in the greatest direction of the stiffening member 40.

In some embodiments, a stiffening member 40 is an assembly of titanium alloy nails. In some embodiments, the assembly of titanium alloy nails of the stiffening member 40 is held by a braided shell 400.

Preferably, a fiber 410 of the stiffening member 40 is made of cured polymerized material, such as pultruded carbon, for example. The fibers 410 in the stiffening member 40 may be of different natures. The braided shell 400 is preferably a braid of carbon fibers, and the tensile mechanical strength of the braid is therefore high. In some embodiments, the braided shell 400 is impregnated with resin.

The stiffening member 40 comprises a material 405 for bonding the unidirectional fibers contained in the shell. The bonding material 405 may be a resin or a foam, for example. The bonding material 405 may be injected according to the RTM (standing for "Resin Transfer Molding") method. The bonding material 405 reduces the stiffness of the stiffening member 40 and reduces the buckling resistance upon compression of the stiffening member 40 with respect to a stiffening member 40 which comprises only fibers 410 assembled by a braided shell 400.

The braided shell 400 of the stiffening member 40 stabilizes the unidirectional fibers 410 and resists buckling of the stiffening member 40. The unidirectional fibers 410 are preferably juxtaposed. The section of the fibers 410 is polygonal, circular or ovoid, for example. Preferably, the section of the fibers 410 is circular.

The unidirectional fibers 410 of the stiffening member 40 may be assembled with or without polymerization.

The stiffening member 40 has at least one portion in the form of a truncated cylinder. It is recalled that a cylinder is a surface in space defined by a straight line, called a generatrix, passing through a variable point describing a closed planar curve, called a directrix curve, and keeping a fixed direction.

Preferably, the directrix curve of the truncated cylinder of the stiffening member 40 is a circle, a polygon or an ovoid curve.

A stiffening member 40 has at least one portion in the form of a truncated cone. It is recalled that a cone is a ruled surface defined by a straight line, called a generatrix, passing through a fixed point, called a vertex, and a variable point describing a closed planar curve, called a directrix curve.

Preferably, the stiffening member 40 consists of a truncated cylinder juxtaposed with a truncated cone. The truncated cone is a cone of revolution. The directrix curve of the truncated cone of the stiffening member 40 is identical to the directrix curve of the truncated cylinder of the stiffening member 40. The largest base of the truncated cone and a base of the truncated cylinder coincide. Preferably, the directrix curve of the truncated cone is a circle and the directrix curve of the truncated cylinder is a circle.

In some embodiments, the stiffening member 40 may comprise at least one pre-damaged section, such as one or more notches. The space between the notches is the same, for example. A fiber 410 of the stiffening member 40 may comprise at least one pre-damaged section, such as one or more notches, the space between the notches being the same, for example.

The embodiments of stiffening members 115, 215 and 315 may include an embodiment 40 of a stiffening member as described above.

Figure 5:
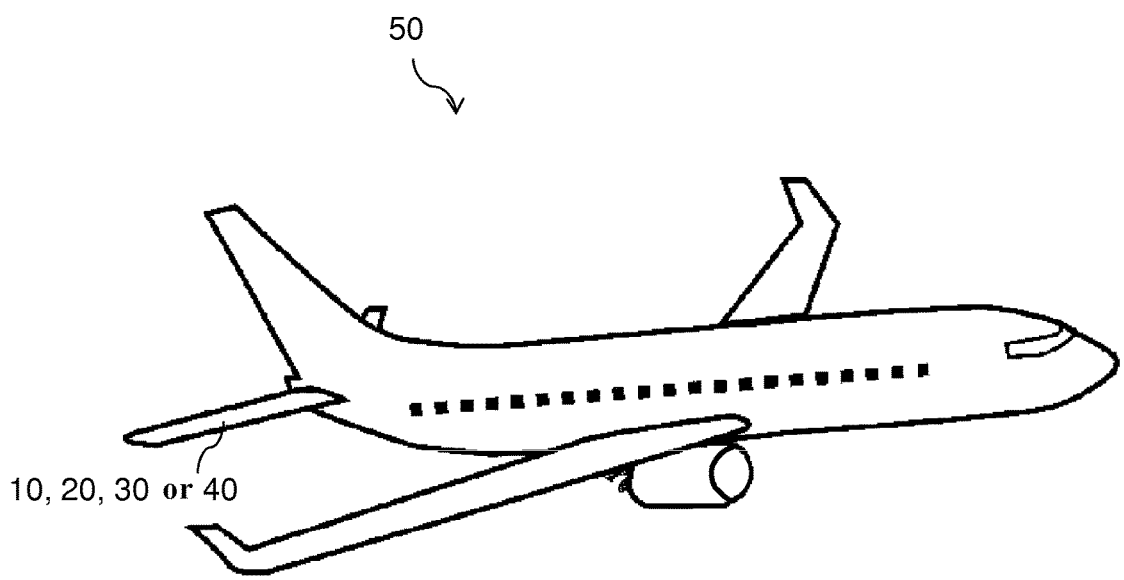
FIG. 5 shows, schematically and in perspective, a first embodiment of an aircraft according to the present invention, FIG. 6 schematically shows a first embodiment of a vehicle according to the present invention, FIG. 7 schematically shows a first embodiment of equipment according to the present invention, and FIG. 8 schematically shows a first embodiment of an installation according to the present invention.

FIG. 5 shows an embodiment 50 of an aircraft according to the present invention.

The aircraft 50 comprises an embodiment 10, 20 of a device according to the present invention. The embodiments 10, 20 of the device according to the present invention may comprise part 30, 40 of a device according to the present invention.

Embodiment 10 or 20 may be comprised of:
at least part of the fuselage of the aircraft 50,
a leading edge of a wing of the aircraft 50,
a tail assembly of the aircraft 50,
a pylon of an engine of the aircraft 50,
a leading edge of a nacelle of the aircraft 50,
a blade, a propeller, a vane of an engine of the aircraft 50,
a front tip of the aircraft 50,
any other part of the aircraft 50 liable to be subjected to an exceptional load.

Figure 6:
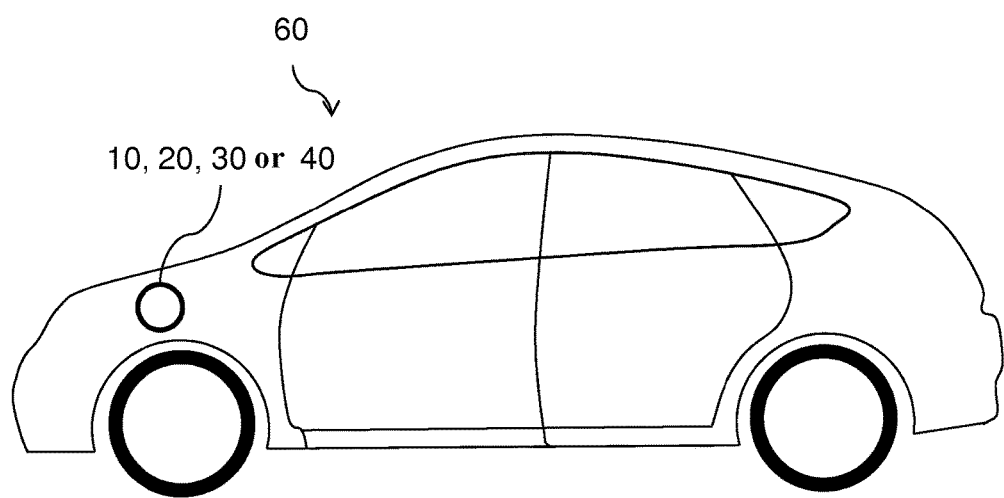

FIG. 6 shows an embodiment 60 of a vehicle according to the present invention.

The vehicle 60 includes an embodiment 10, 20 of a device according to the present invention. The embodiments 10, 20 of the device according to the present invention may comprise part 30, 40 of a device according to the present invention.

Embodiment 10 or 20 may be comprised of at least part of the vehicle body or any other part of the vehicle liable to be subjected to an exceptional load.

Figure 7:
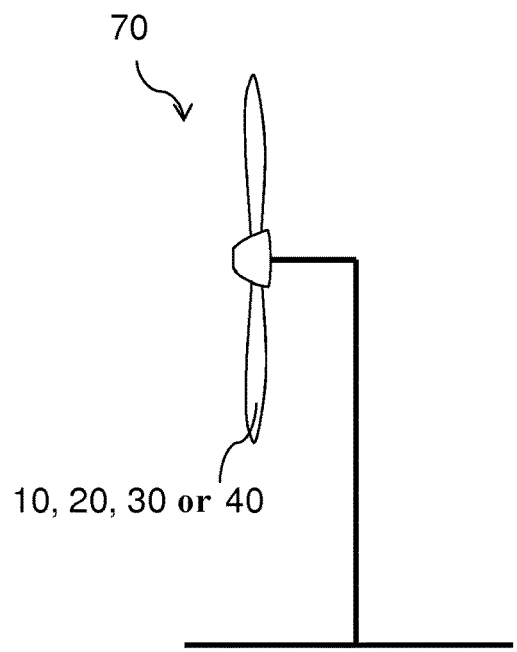

FIG. 7 shows an embodiment 70 of equipment according to the present invention.

The equipment 70 includes an embodiment 10, 20 of a device according to the present invention. The embodiments 10, 20 of the device according to the present invention may comprise part 30, 40 of a device according to the present invention. The equipment 70 may be a wind turbine, for example.

Embodiment 10 or 20 may be comprised of a movable part of the equipment 70, part of the external structure of the equipment 70, or any other part of the equipment 70 liable to be subjected to an exceptional load.

Figure 8:
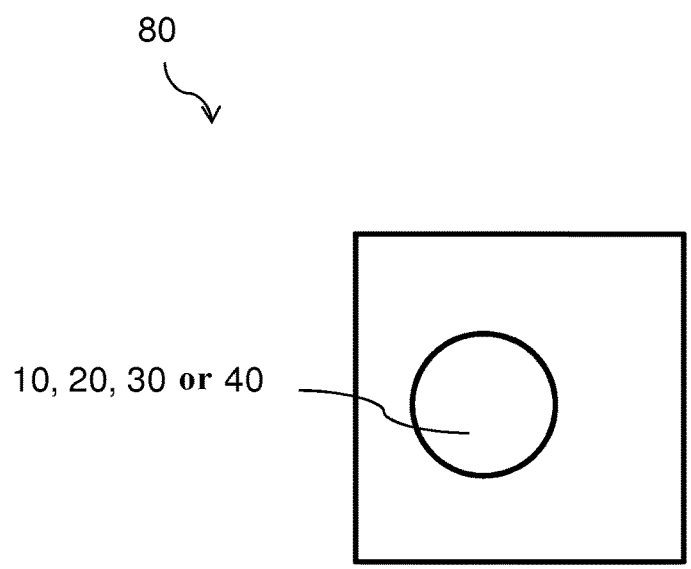

FIG. 8 shows an embodiment 80 of an installation according to the present invention.

The installation 80 includes an embodiment 10, 20 of a device according to the present invention. The embodiments 10, 20 of the device according to the present invention may comprise part 30, 40 of a device according to the present invention. The installation 80 is an air conditioning device, for example.

Embodiment 10 or 20 may be comprised of a movable part of the installation 80, part of the external structure of the installation 80, or any other part of the installation 80 liable to be subjected to an exceptional load.

The invention claimed is:

1. A device to absorb kinetic energy due to an exceptional load, comprising:
   an outer shell configured to maintain its integrity after the exceptional load;
   a core made of compactable material at least partially filling the outer shell, the compactable material constituting the core compacted under the exceptional load and absorbing a part of the kinetic energy due to the exceptional load;
   at least one stiffening member integrated in the core; and
   a distribution member comprising each stiffening member,
   wherein said at least one stiffening member is an assembly of unidirectional fibers,
   wherein the unidirectional fibers of said at least one stiffening member are held by a braided shell.

2. The device as claimed in claim 1, further comprising a diffusion member to diffuse the exceptional load on the core.

3. The device as claimed in claim 2, wherein the diffusion member comprises one of the following material: a titanium alloy, an aluminum alloy, a PBO (p-phenylene-2,6-benzobisoxazole) composite, a non-woven composite, a polyethylene composite, an aramid composite or a glass composite.

4. The device as claimed in claim 1, wherein said at least one stiffening member comprises a bonding material to bond the unidirectional fibers.

5. The device as claimed in claim 1, wherein at least one unidirectional fiber of said at least one stiffening member is made of a cured polymerized material.

6. The device as claimed in claim 1, wherein at least a portion of said at least one stiffening member is a truncated cylinder.

7. The device as claimed in claim 1, wherein at least a portion of said at least one stiffening member is a truncated cone.

8. The device as claimed in claim 1, wherein said at least one stiffening member is integrated in a concave relief comprised in the core.

9. The device as claimed in claim 1, wherein each stiffening member is distributed equally by the distribution member.

10. The device as claimed in claim 1, wherein the distribution member comprises one of the following material: a titanium alloy, an aluminum alloy, a PBO (p-phenylene-2,6-benzobisoxazole) composite, a non-woven composite, a polyethylene composite, an aramid composite or a glass composite.

11. An aircraft comprising the device as claimed in claim 1.

12. A vehicle comprising the device as claimed in claim 1.

13. An equipment comprising the device as claimed in claim 1.

14. An installation comprising the device as claimed in claim 1.

* * * * *